No. 892,894. PATENTED JULY 7, 1908.
W. J. ROMAN.
ADJUSTABLE BORING TOOL HOLDER.
APPLICATION FILED JULY 19, 1906.

WITNESSES—
C. B. Baenziger
E. M. Spielburg

INVENTOR—
Walter J. Roman
By Newell S. Wright
His Attorney.

UNITED STATES PATENT OFFICE.

WALTER J. ROMAN, OF DETROIT, MICHIGAN, ASSIGNOR TO JOSEPH W. DAVIS, OF DETROIT, MICHIGAN.

ADJUSTABLE BORING-TOOL HOLDER.

No. 892,894.

Specification of Letters Patent.

Patented July 7, 1908.

Application filed July 19, 1906. Serial No. 326,836.

*To all whom it may concern:*

Be it known that I, WALTER J. ROMAN, a citizen of the United States, residing at Detroit, county of Wayne, State of Michigan, have invented certain new and useful Improvements in Adjustable Boring-Tool Holders, of which the following is a specification, reference being had to the accompanying drawings, which form a part of this specification.

Figure 1:
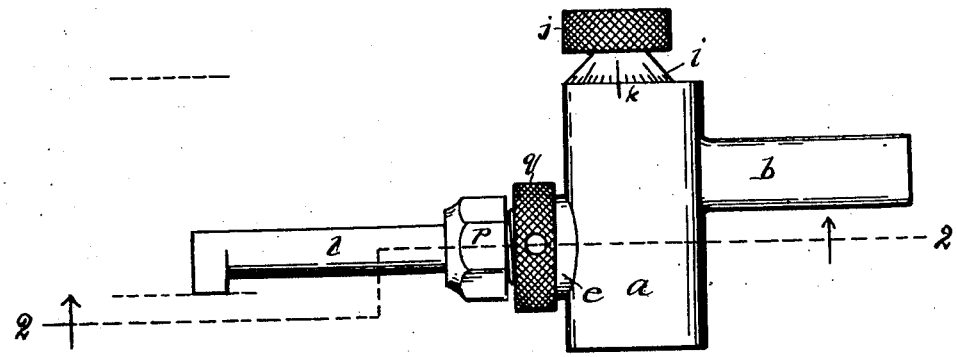
Figure 2:
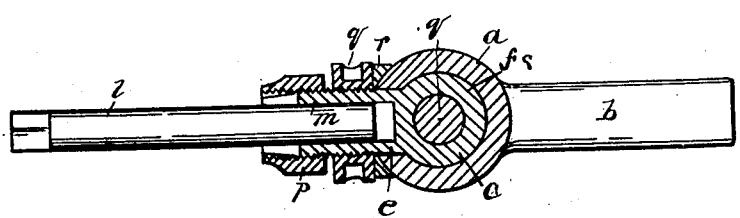
Figure 4:
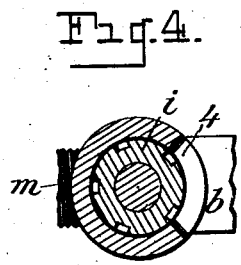
Figure 3:
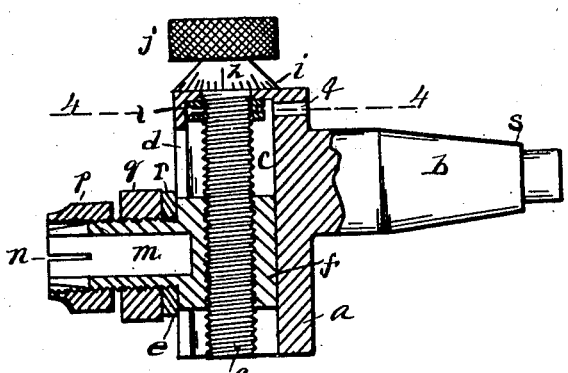

My invention has for its object an adjustable boring tool holder and it consists of the construction, combination and arrangement of devices hereinafter described and claimed and illustrated in the accompanying drawings, in which, Figure 1 is a view in side elevation. Fig. 2 is a view in section on the line 2—2, Fig. 1. Fig. 3 is a view in section at right angles to that shown in Fig. 2 through the chambered body, the tool being omitted. Fig. 4 is a cross section on the line 4—4, Fig. 3.

My invention is designed to provide an adjustable boring tool holder whereby a hole may be made of varying diameters. My improved holder is more especially adapted for boring tools used in boring metals. I contemplate, however, as coming within the scope of my invention all uses to which the same may be found applicable. The utility of a tool holder of this description will be evident.

I carry out my invention as follows:

In the drawings $a$ represents the body of the holder, the same being provided with a shank $b$ of any desired form, whereby the holder may be engaged in a suitable device for service. The body of the holder is chambered longitudinally thereof as indicated at $c$ and is provided with an open elongated slot $d$ on the side thereof opposite the shank. Within the chamber $c$ is located the inner end of a movable chuck or jaw $e$, the same being formed with a head $f$ interiorly threaded, said head being movable longitudinally within the chamber $c$, as by means of an adjusting or traversing screw $g$ having a threaded engagement with the head of the chuck, said screw being provided with a flanged head $h$ constructed with graduations indicated at $i$ and with a head $j$, the adjacent face of the body being also provided with an index line or mark shown at $k$. The movable chuck is constructed in any suitable manner to receive a boring or analogous tool $l$. The chuck is shown provided with a projecting arm chambered as at $m$ to receive the corresponding end of the tool. The outer end of the chuck is shown slotted as at $n$, a nut $p$ serving to clamp the tool in the chuck. A clamping nut $q$ is threaded upon the projected arm binding upon the washer $r$ between the nut, and the body $a$ serves to hold the chuck in any given position in which it may be set. The shank $b$ is shown in Fig. 3 with a taper at $s$ preferably a Brown and Sharpe taper.

It will be evident that the chuck may be adjusted on the longitudinal center of the shank $b$, or it may be adjusted outward from the longitudinal center, in which case it will cut a hole of corresponding diameter.

To hold the screw $g$ so that when the chuck is moved by the screw the screw will not then move backward or forward, I prefer to provide a jam nut shown in Fig. 3 at $l$ upon the screw within said body. The flange $h$ bearing against the end of the body will hold the screw on one side while the jam nut may be adjusted in position on the inside, so that any wear may readily be taken up.

It will be evident that the inner wall of the body serves as a guide for the inner end of the chuck.

In order to manipulate the lock nut upon the screw within the chambered body, the body is provided with an orifice indicated at the numeral 4 adjacent to the lock nut whereby a pin or suitable instrument may engage the lock nut to move it upon the screw.

What I claim as my invention is:

1. An adjustable boring tool holder comprising a body having an elongated slot, a chuck member adapted to receive a tool having an outwardly projecting chambered arm extending through said slot and slidable therein and provided with an interiorly threaded head within said body, a traversing screw threaded through the head arranged to move said chuck in said slot, and a clamping nut threaded upon the projecting arm of the chuck adapted to fixedly hold the chuck in place.

2. An adjustable boring tool holder comprising a cylindrical chambered body having an elongated slot, a chuck member adapted to receive a tool and having an outwardly projecting chambered arm extended through the slot and slidable therein and provided with an enlarged movable head filling the circular chamber of the cylindrical body, diametrically, and a clamping nut to fixedly hold the chuck in place.

3. An adjustable tool holder comprising a chambered body provided with an elongated slot opening through one side thereof, a chuck constructed with an interiorly threaded head projecting through said slot and movable within the chamber of the body, an adjusting screw engaged with one end of the body and with the head of the chuck, means to lock the chuck in given position, and a lock nut within the body upon the adjusting screw, said body provided with an opening adjacent to the lock nut whereby the lock nut may be manipulated, for the purpose described.

In testimony whereof, I have signed this specification in the presence of two subscribing witnesses.

WALTER J. ROMAN.

Witnesses:
N. S. WRIGHT,
E. M. SPIELBURG.